United States Patent [19]
Hurson

[11] 3,739,558
[45] June 19, 1973

[54] ODOR ADSORBER

[75] Inventor: Frank W. Hurson, North Vancouver, British Columbia, Canada

[73] Assignee: Canadian Char-Co. Ltd., Burnaby, British Columbia, Canada

[22] Filed: Dec. 6, 1971

[21] Appl. No.: 205,153

[52] U.S. Cl.................................. 55/387, 55/515
[51] Int. Cl............................................ B01d 53/04
[58] Field of Search ..................... 55/74, 310, 316, 55/387, 388, 515

[56] References Cited
UNITED STATES PATENTS
2,303,332  12/1942  Dauphince............................ 55/515
3,376,695  4/1968  Muckley.............................. 55/387

Primary Examiner—Charles N. Hart
Attorney—Kellard A. Carter

[57] ABSTRACT

An odor adsorbing device in the form of a perforated elongated container filled with activated carbon particles. A cap is removably mounted on the container, allowing the device to be refilled.

1 Claim, 5 Drawing Figures

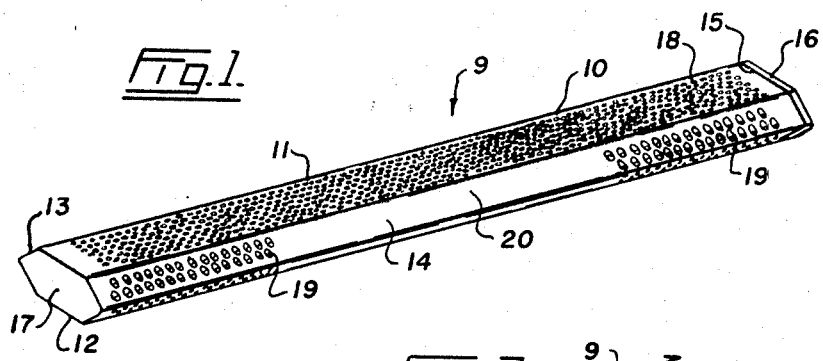
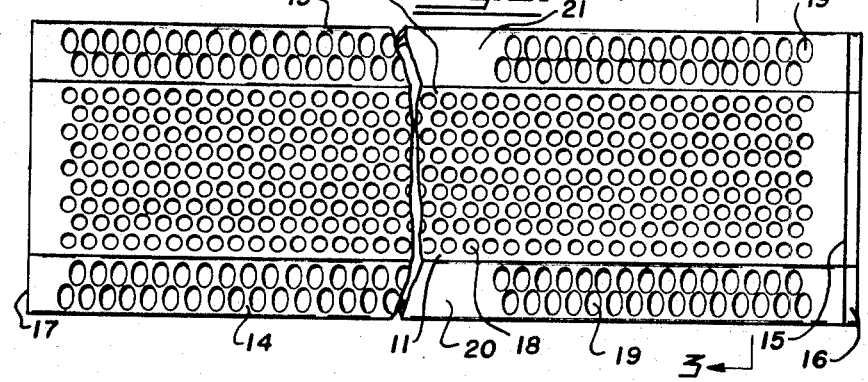
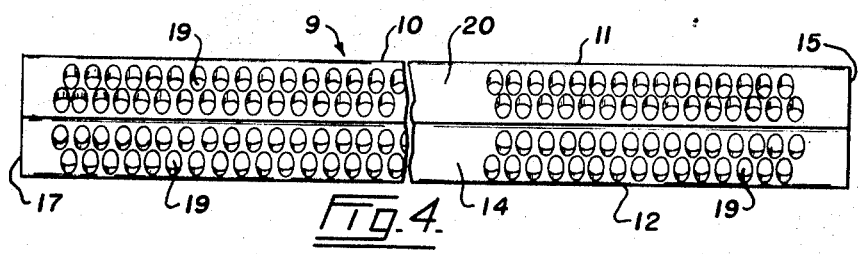
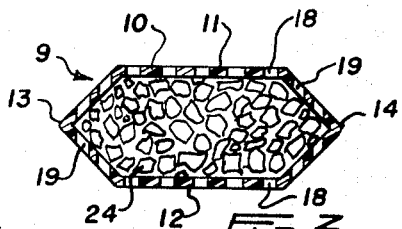
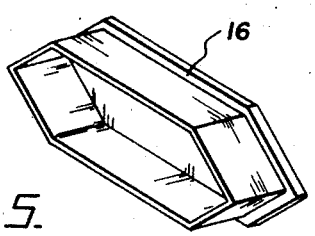

ODOR ADSORBER

This invention relates to devices for adsorbing odors, and particularly odors in confined spaces.

In the past, devices for containing a fumigant have been put on the market. These devices are designed to release a perfumed scent in the general area where they are positioned. The perfume does not eliminate foul odors but only masks them with a new, more pleasant odor. In some cases, such as in a refrigerator, these devices are not practical.

The present odor adsorber is designed particularly for use in confined spaces, such as, refrigerators, freezers, showcases, clothes and shoe closets, boats, trailers, campers and the like. This absorber eliminates odors without creating counter odors, and is such that it will continue to be effective for relatively long periods, such as for at least one year.

An odor adsorber in accordance with the present invention comprises an elongated container, closed at opposite ends, the walls of said container having a plurality or perforations therein, and activated carbon particles filling said container.

In drawings which illustrate a preferred embodiment of the invention,

FIG. 1 is a reduced perspective view of the odor adsorber,

FIG. 2 is a plan view of the odor adsorber,

FIG. 3 is a cross-section taken along the line 3—3 of FIG. 2,

FIG. 4 is a side elevation of the adsorber, and

FIG. 5 is a perspective view of an end cap for the adsorber.

In the drawings, 9 generally indicates an odor adsorber according to the present invention. This adsorber includes an elongated container 10 having opposed main walls 11 and 12, and opposed side walls 13 and 14 of V-shaped configuration. Container 10 has an opening 15 in one end thereof, into which an end cap 16 removably fits. The opposite end of the container is closed by a wall 17.

Main walls 11 and 12 have a plurality of holes or perforations 18 therein throughout the length thereof. These holes may be of any desired size, and holes approximately nine thirty-seconds of an inch in diameter have been found to be satisfactory. Side walls 13 and 14 have a plurality of holes or perforations 19 in sections adjacent opposite ends of the container, as seen in FIG. 1. The holes 19 in side walls 13 and 14 are near opposite ends of container 10, leaving unperforated, relatively long sections 20 and 21 between said hole sections. These unperforated sections being of V-shape configuration, act as braces for container 10 to prevent breaking of the container as a result of the weakening of the walls thereof by the perforations therein.

As seen in FIG. 3, the holes 18 and 19 allow the odor filled air to pass through the inside of the container 10. Container 10 is filled with irregularly sized and shaped activated carbon particles 24. These particles are shaped in this manner so that they will not pack too closely together, thereby leaving spaces therebetween allowing air to travel relatively freely. Holes 18 and 19 are made as large as possible, but must be small enough to prevent the carbon particles from passing therethrough.

Carbon particles 24 are preferably coconut shell particles which have been treated with helium to remove their natural odors and to clean said particles. Although these particles 24 adsorb odors, they themselves are odorless. The preferred size of particles 24 is such that they will pass through a 10 to 16 mesh screen.

Before placing the carbon particles 24 in container 10, the odor adsorbing qualities thereof can be tested by subjecting a measured sample thereof to a standard carbon tetrachloride test in suitable testing apparatus. In this test, air is directed at a measured rate consecutively through new charcoal and silica gel to remove impurities and moisture respectively. After being bubbled through carbon tetrachloride solution, this air is directed through the sample of the carbon particles and then to the flame of a bunsen burner. This flame is blue as long as the carbon particles are adsorbing the tetrachloride fumes from the air, but when the particles are saturated, the flame starts burning the fumes and turns green. If it takes about 50 or 55 minutes for the carbon particles to become saturated, the activated particles from which the sample was taken are considered to be suitable for the adsorber. If less time is taken, the adsorptive qualities of the activated particles are considered to be not good enough for this device.

It will be noted that container 10 is relatively long and thin, that is, the main walls 11 and 12 are quite close together. With this arrangement, all of the activated carbon particles are subjected to the odorous air passing through the adsorber by natural convection. The perforations or holes in the main walls 11 and 12 and in side walls 13 and 14 expose the carbon particles to the air, and side wall sections 20 and 21 of V-shape cross-section brace the container against any weakness created by the large number of holes.

I claim:

1. An odor adsorber comprising an elongated and thin container of hexagonal cross-section and having one end open, a cap removably closing said open end, said container having opposed main walls and opposed side walls of V-shape configuration, said main walls having a plurality of perforations therein arranged in closely spaced relation and substantially covering the area between opposite ends of the container, said side walls having perforated sections adjacent opposite ends of the container and unperforated sections between the perforated sections thereof, said unperforated sections extending longitudinally of the container and acting as braces therefor, and activated carbon particles filling the container, said carbon particles being irregular in size and shape and comprising treated coconut shell particles.

* * * * *